(12) United States Patent
Diel

(10) Patent No.: US 9,404,586 B2
(45) Date of Patent: Aug. 2, 2016

(54) VALVE DEVICE AND METHOD FOR TRANSFERRING A TRANSFER MEDIUM

(75) Inventor: Bernhard Diel, Dransfeld (DE)

(73) Assignee: Sartorius Stedim Biotech GmbH (DE)

( * ) Notice: Subject to any disclaimer, the term of this patent is extended or adjusted under 35 U.S.C. 154(b) by 37 days.

(21) Appl. No.: 14/348,785

(22) PCT Filed: Sep. 11, 2012

(86) PCT No.: PCT/EP2012/003813
§ 371 (c)(1),
(2), (4) Date: Mar. 31, 2014

(87) PCT Pub. No.: WO2013/045032
PCT Pub. Date: Apr. 4, 2013

(65) Prior Publication Data
US 2014/0246617 A1 Sep. 4, 2014

(30) Foreign Application Priority Data

Sep. 30, 2011 (DE) .......................... 10 2011 114 573

(51) Int. Cl.
*F16K 1/22* (2006.01)
(52) U.S. Cl.
CPC . *F16K 1/22* (2013.01); *F16K 1/222* (2013.01); *F16K 1/223* (2013.01); *Y10T 29/49405* (2015.01); *Y10T 137/87941* (2015.04)
(58) Field of Classification Search
CPC ........... F16K 1/22; F16K 1/223; F16K 1/222; F16K 1/2021; F16K 1/2024; F16K 1/205; Y10T 137/87925; Y10T 137/87933; Y10T 137/87941; Y10T 137/88038; Y10T 137/6028

USPC ........ 141/346–347; 137/614, 614.01, 614.02, 137/614.18, 315.16
See application file for complete search history.

(56) References Cited

U.S. PATENT DOCUMENTS 1,857,477 A    5/1928  Ritter
(Continued)

FOREIGN PATENT DOCUMENTS

| CH | 695425 | 5/2006 |
|---|---|---|
| CN | 201925493 | 8/2011 |
| DE | 102008034341 | 1/2010 |
| EP | 1245894 | 10/2002 |

(Continued)

OTHER PUBLICATIONS

International Search Report of Nov. 7, 2012.

*Primary Examiner* — Michael R Reid
(74) *Attorney, Agent, or Firm* — Gerald E. Hespos; Michael J. Porco; Matthew T. Hespos

(57) ABSTRACT

The invention relates to a valve device and to a method for transferring a transfer medium, said valve device and method having an inflow, an outflow and two valve disks which are arranged one behind another in the direction of flow and are pivotable about a common rotational axis for opening and closing the lumen which surrounds them, wherein the inflow and the outflow are formed by two housing sections which are lockable together, the ends of which facing one another receive in each case a valve disk with a fixedly connected half-shaft, wherein, with the housing sections in the locked state, the two half-shafts form one common shaft which is pivotable about the rotational axis and the valve disks abut closely against one another, and wherein, with the housing sections in the non-locked state, the valve disks in each case close the lumen of the housing section receiving them.

11 Claims, 9 Drawing Sheets

(56) References Cited

U.S. PATENT DOCUMENTS

| | | | |
|---|---|---|---|
| 2,333,496 A | | 8/1942 | Townhill et al. |
| 5,284,182 A | * | 2/1994 | McLennan ............ F16K 1/2263 137/242 |
| 5,295,507 A | * | 3/1994 | Bandy ..................... F16K 1/221 137/614.01 |
| 6,311,745 B1 | | 11/2001 | Welch et al. |

FOREIGN PATENT DOCUMENTS

| | | |
|---|---|---|
| EP | 1214142 | 6/2003 |
| EP | 1712498 | 10/2006 |
| FR | 2770426 | 5/1999 |
| GB | 888541 | 1/1962 |
| GB | 2274404 | 7/1994 |
| JP | 2003-267480 | 9/2003 |

* cited by examiner

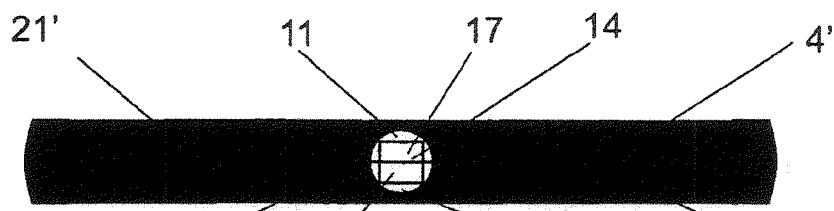
Fig. 12
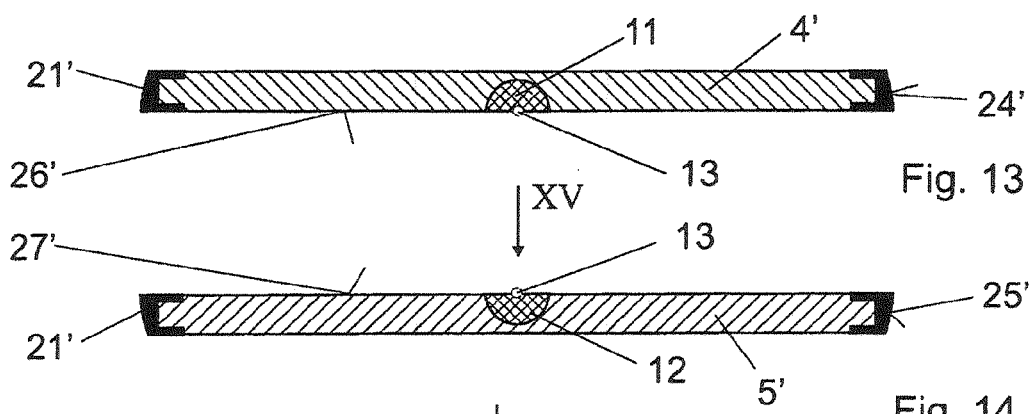
Fig. 13
Fig. 14
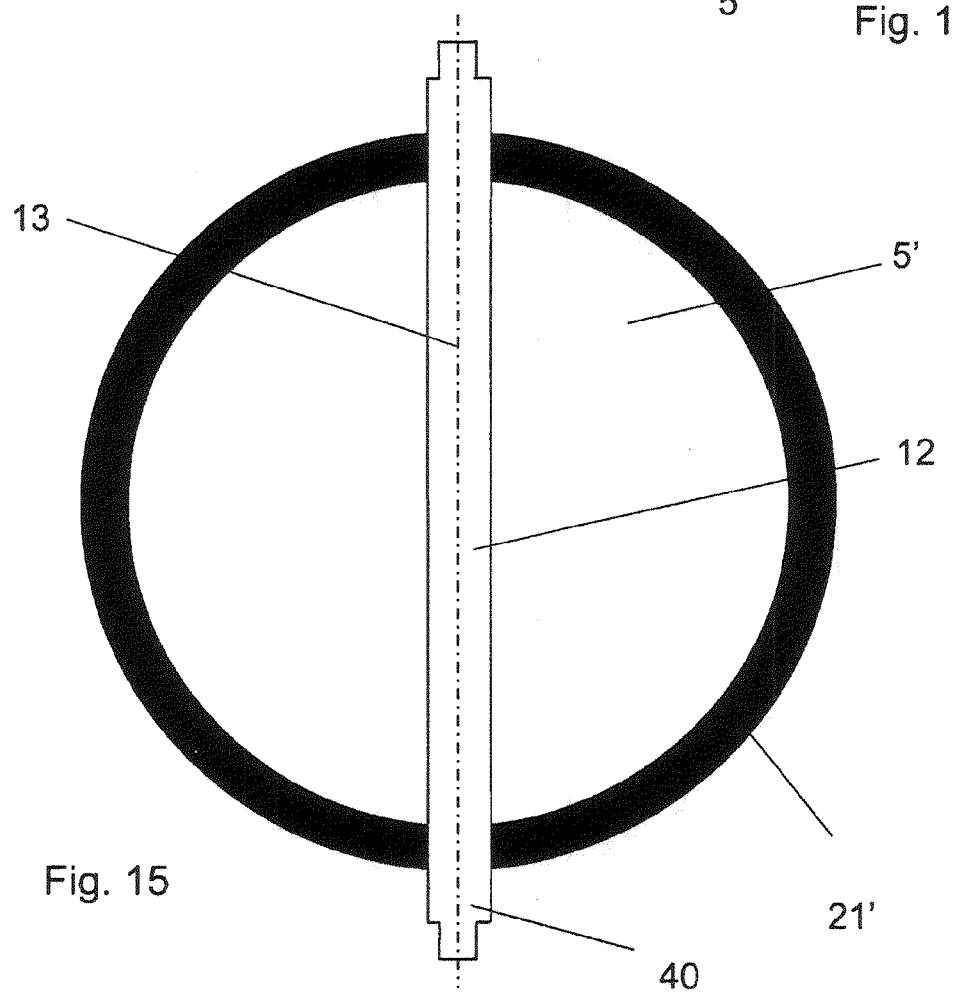
Fig. 15

VALVE DEVICE AND METHOD FOR TRANSFERRING A TRANSFER MEDIUM

BACKGROUND

1. Field of the Invention

The invention relates to a valve device for transferring a transfer medium, said valve device having an inflow, an outflow and two valve disks which are arranged one behind another in the direction of flow and are pivotable about a common rotational axis for opening and closing the lumen which surrounds them.

2. Description of the Related Art

The invention also relates to a method for transferring a transfer medium using a valve device, the inflow of which is connected to a first container which contains the transfer medium and the outflow of which is connected to a second container which receives the transfer medium.

Insofar as transfer media contained in a first container are to be transferred into a separate second container, the problem of preventing said media contaminating the environment frequently arises. Thus, for example, a powdery filtering aid (diatomite/diatomaceous earth), which is transferred as a transfer medium out of a first container into a second container, is used for a precoat filtration. Diatomite, however, is also suspected of being able to trigger respiratory illnesses up to and including bronchiolar carcinomas as a result of its proportions of crystalline particles which pass into the alveolar ducts. As this, however, is only applicable for dry dust like particle forms, it is necessary when working with such filtering aids to take preventive technological measures which, to the greatest possible extent, prevent the development or the release of diatomite dust into the environment and make breathing it in completely impossible. In this case, the use of single-use products in biotechnology has proved to be particularly safe. In the case of single-use products, it is advantageous when they do not comprise any metal and when they are realized in a relatively simple and cost-efficient manner.

FR 2 770 426 A1 makes known arranging a valve device with two valves which are connected one behind the other between a first container with a powdery transfer medium and a second container into which the transfer medium is to be transferred. In this case, the first valve is associated with the first container and the second valve is associated with the second container.

In this case, it is disadvantageous that the two valves are connected together by means of a connecting arrangement which comprises an intermediate space. The intermediate space of the connecting arrangement has to be cleaned prior to separating the containers from one another in order to prevent contamination of the environment.

Insofar as two flap valves, as are known, for example, from U.S. Pat. No. 1,857,477, are connected one behind another, there is the above-depicted problem of the intermediate space between the flaps or valve disks having to be rid of a possible contamination prior to separation, for example as a result of rinsing.

DE 10 2008 034 341 A1 makes known a valve device for transferring a transfer medium, said valve device having an inflow, an outflow and two valve disks which are arranged one behind another in the direction of flow and are pivotable about a common rotational axis for opening and closing the lumen surrounding them.

Here too, it is disadvantageous that in the open state the valve plates are in each case contaminated from their two sides. Such a two-way valve for the transfer of hot exhaust gas flows in exhaust gas installations is also not designed for the transfer of particulate transfer media avoiding the development of dust.

It is an object of the present invention, consequently, to create a valve device which, once a transfer medium has been transferred, enables separation of the inflow and outflow without expensive cleaning and without contaminating the environment. In addition, the device is to be designed in a simple manner and is to be suitable for cost-efficient use as a single-use product.

A further object is to provide a method for transferring a transfer medium using a corresponding valve device.

SUMMARY OF THE INVENTION

The invention relates to a valve device where an inflow and an outflow are formed by two housing sections that are lockable together, the ends of which facing one another receive in each case a valve disk with a fixedly connected half-shaft, that, with the housing sections in the locked state, the two half-shafts form a common shaft which is pivotable about the rotational axis and the valve disks abut closely against one another, and that, with the housing sections in the non-locked state, the valve disks in each case close the lumen of the housing section receiving them.

As a result of the valve disks comprising in each case a half-shaft, they are able to abut closely against one another, the half-shafts forming one common shaft about which they are pivotable together. The result is that the faces of the valve disks which abut against one another do not contaminate, this means do not come into contact with the transfer medium during the transferring process. Once the housing sections have been unlocked or separated, in each case the non-contaminated faces of the valve disks lie on the outside and prevent contamination of the environment. The valve disk can be latched or locked to the housing section to avoid unintentional opening of the housing section receiving it. The valve device is designed in a simple and cost-efficient manner and can dispense with metal entirely and is suitable as a single-use product. Additional rinses are no longer necessary as there is no space to be rinsed between the valve disks.

According to a preferred embodiment of the invention, the two half-shafts which abut against one another project by way of at least one end out of the walls of the housing sections receiving them and together form a form attachment, onto which an actuating part with a corresponding receiving opening can be placed. The valve disks can consequently be pivoted easily about their axis. In a preferred manner, in this case, the form attachment is realized as a square in cross section. Other cross sections are also possible as long as the actuating part and the form attachment rotating against one another in an unwanted manner is prevented as a result of positive locking for the actuating part with respect to the form attachment.

According to a further preferred embodiment of the invention, a seal is arranged between the outside edge of the valve disks and the adjacent walls thereof of the housing sections. Secure sealing of the lumen of the housing sections or of the inflow and of the outflow is ensured as a result of the seal.

According to a further preferred embodiment of the invention, the outside edge of the valve disks in each case comprises a cap-shaped circumferential seal which seals, on the one hand, the valve disks with respect to the adjacent lumen and, on the other hand, the valve disks on the edge with respect to one another.

According to a further preferred embodiment of the invention, the housing sections on their ends remote from the valve disks comprise in each case comprise a connecting piece for connection to a corresponding connecting piece. The valve device is consequently usable in a varied manner. The first housing section which comprises the inflow is connectable to a connecting piece of a first container and the second housing section which comprises the outflow is connectable to a connecting piece of a second container. The connecting pieces, in this case, can be realized as parts of a clamping joint which is known to the expert as a tri-clamp joint.

According to a further preferred embodiment of the invention, the transfer medium is a bulk material (e.g. a powder or a liquid) and the first container is realized as a sack, out of which the bulk material is transferable, in the case of a powder transferable in a dust-free manner, into the second container which is realized as a target or mixing sack.

The object with reference to the method is achieved in conjunction with the preamble of claim 9, in that the following steps are carried out:

a) connect a first housing section, which comprises the inflow and on its end remote from the first container comprises a first valve disk with a first half-shaft in a position which closes the inflow, to the first container;

b) connect a second housing section, which comprises the outflow and on its end remote from the second container comprises a second valve disk with a second half-shaft in a position which closes the outflow, to the second container;

c) connect together the ends of the housing sections comprising the valve disks such that the two half-shafts form one common shaft and the valve disks abut closely against one another by way of their outer faces which face one another;

d) place an actuating part onto an end of the common shaft of the valve disks; and e) open the valve device by pivoting the common shaft with the two valve disks into an open position;

f) close the valve device by pivoting the two valve disks back into their closed position after the provided amount of transfer medium is transferred into the second container; and g) release the connection between the first and the second container by pulling off the actuating part and releasing from one another the two housing parts which are closed by the valve disks.

Consequently, the first container with the inflow of the valve device and the second container with the outflow of the valve device can be connected in a simple and secure manner. The containers can be separated again in a correspondingly simple manner once the transfer medium has been transferred without an expensive rinsing operation being necessary to avoid unwanted contamination of the environment.

The ends of the housing sections which comprise the valve disks can be latched together in a simple manner as a result of fitting into one another and rotating.

A powdery filtering aid for a precoat filtration can be transferred, for example, as the transfer medium.

Further details of the invention are produced from the following detailed description and from the accompanying drawings in which preferred embodiments of the invention are illustrated as an example.

BRIEF DESCRIPTION OF THE DRAWINGS

FIG. 12 shows an enlarged representation of a side view of the valve disks of FIG. 9, FIG. 13 shows a side view, represented in section and enlarged, of the first valve disk of FIG. 9, FIG. 14 shows a side view, represented in section and enlarged, of the second valve disk of FIG. 9 and FIG. 15 shows a top view of the second valve disk of FIG. 14 from the direction XV.

DETAILED DESCRIPTION OF THE PREFERRED EMBODIMENTS

Figure 1:
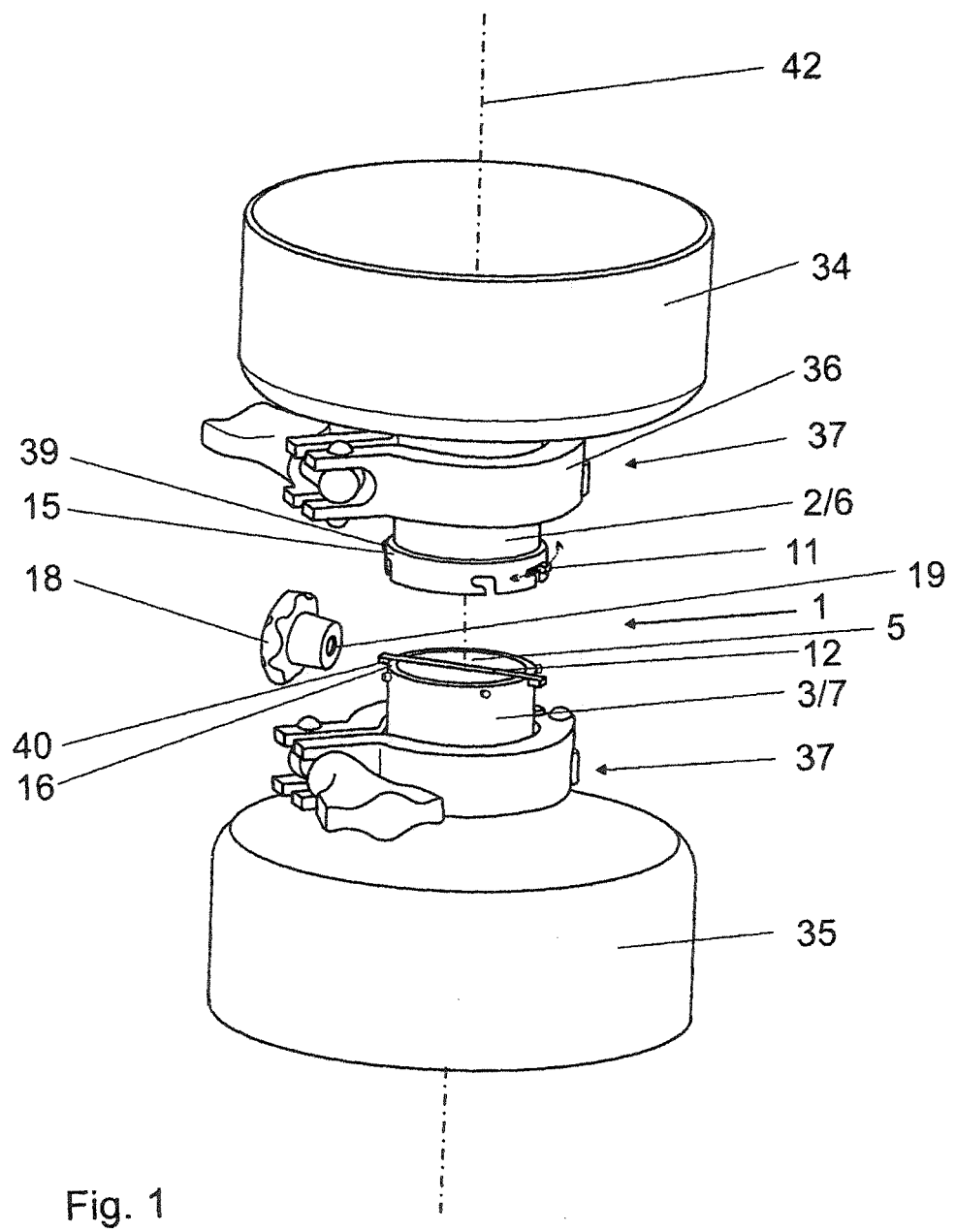
FIG. 1 shows a three-dimensional representation of a valve device connected to a first container with transfer medium and to a second container as the target container of the transfer medium to be transferred, with the valve device in the separated state.

A valve device 1 consists substantially of an inflow 2, an outflow 3 and two valve disks 4, 5 which are arranged one behind another in the direction of flow.

The inflow 2 is formed by a first housing section 6. The outflow 3 is formed by a second housing section 7.

The two housing sections 6, 7 are lockable together at their ends 8, 9 which face one another by means of at least one locking means 10 (four locking means 10 in the exemplary embodiment of FIG. 1) which can be realized as a bayonet closure. The first housing section 6 comprises the first valve disk 4 at its end 8. The second housing section 7 comprises the second valve disk 5 on its end 9. The first valve disk 4 comprises a half-shaft 11 which is fixedly connected thereto and by way of which it is mounted so as to be pivotable in the end 8. In a corresponding manner, the second valve disk 5 comprises a second half-shaft 12, by way of which it is mounted so as to be pivotable in the end 9.

With the housing sections 6, 7 in the locked state, the half-shafts 11, 12 form one common shaft 14 which is pivotable about a virtual rotational axis 13. The half-shafts 11, 12 project in each case by way of their shaft ends 39, 40 out of the walls 15, of the housing sections 6, 7 receiving them and, with the housing sections 6, 7 in the locked state, form a form attachment 17, onto which an actuating part 18 with a corresponding receiving opening 19 can be placed.

In the exemplary embodiment, the form attachment 17 comprises a square 20 as cross section.

Two L-shaped recesses 41, which are located opposite one another and receive the ends 39 of the first half-shaft 11, are arranged in the wall 15 of the bottom end 8 of the first housing section 6, the first half-shaft 11 being lockable as a result of pivoting about the longitudinal axis 42 of the valve device 1 with its ends 39 in the short portions 43 of the L-shaped recesses 41 which extend transversely with respect to the longitudinal axis 42. As a result of the semicircular form of the ends 39, the half-shaft and consequently the first valve disk 4 are prevented in a positive-locking manner from rotating with the first half-shaft 11 in the locked position.

With the housing sections 6, 7 in the locked position, the ends 40 of the second half-shaft 12 engage in the long portions 43 of the L-shaped recesses 41 which extend parallel to the longitudinal axis 42 such that, with the first half-shaft 11 in the unlocked position, the first half-shaft 11 forms the pivotable shaft 14 with the second half-shaft 12. In its locked position, the first half-shaft 11 blocks the rotation or the pivoting of the second half-shaft 12 at the same time.

Figure 2:
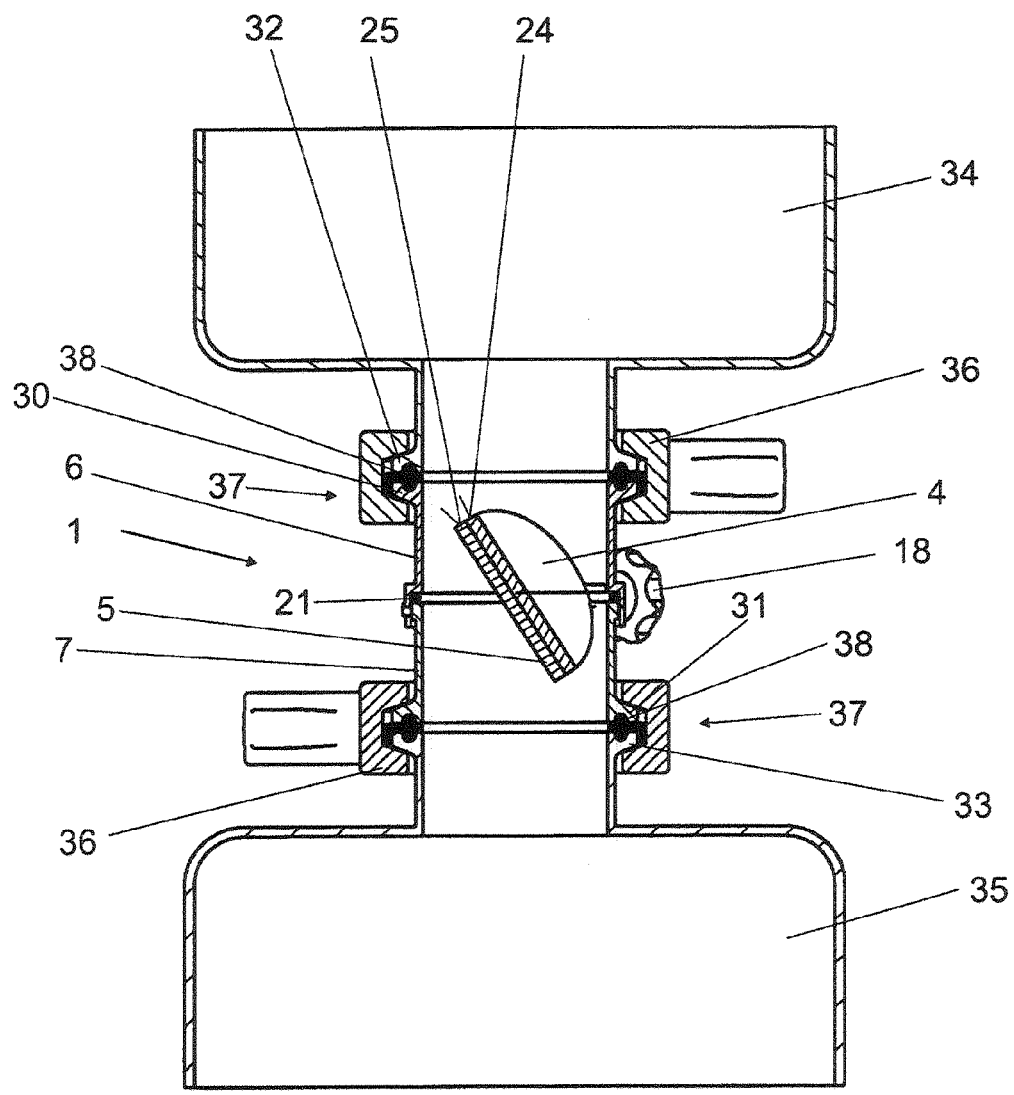
FIG. 2 shows a side view in section of the device of FIG. 1 in the connected state with the valve disks in the open position.
Figure 3:
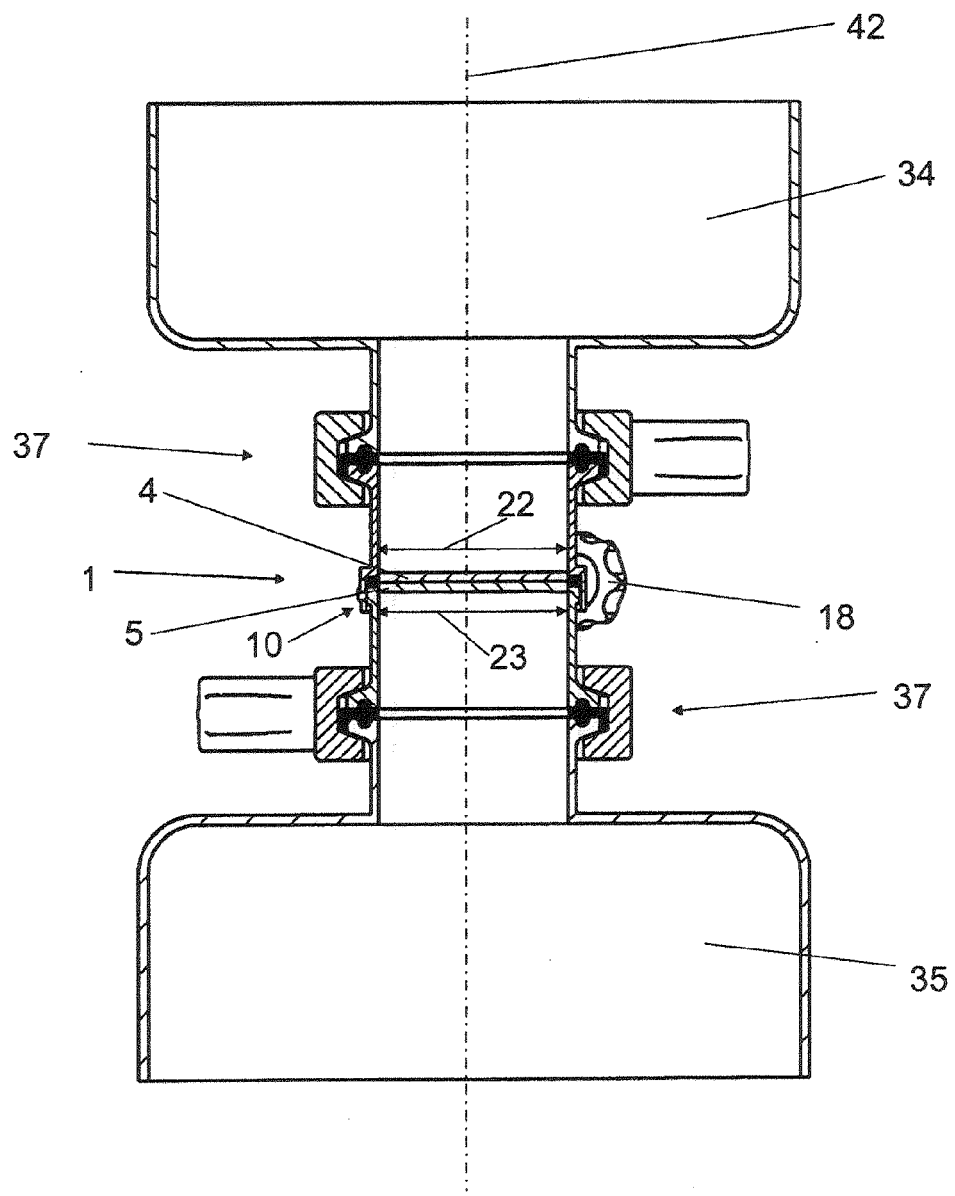
FIG. 3 shows a side view in section of the device of FIG. 2 in the connected state with the valve disks in the closed state.
Figure 4:
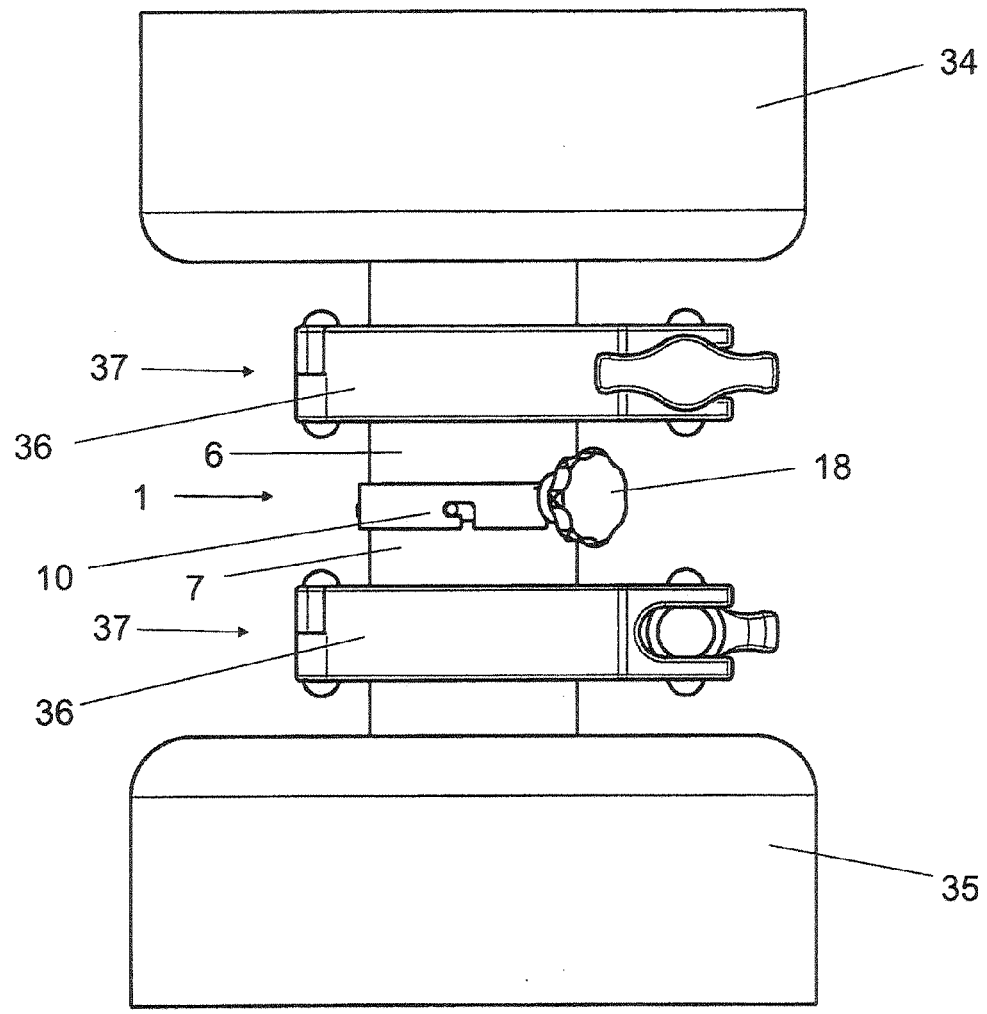
FIG. 4 shows a side view of the device of FIG. 2 in a perspective rotated by 90 degrees about the longitudinal axis.
Figure 5:
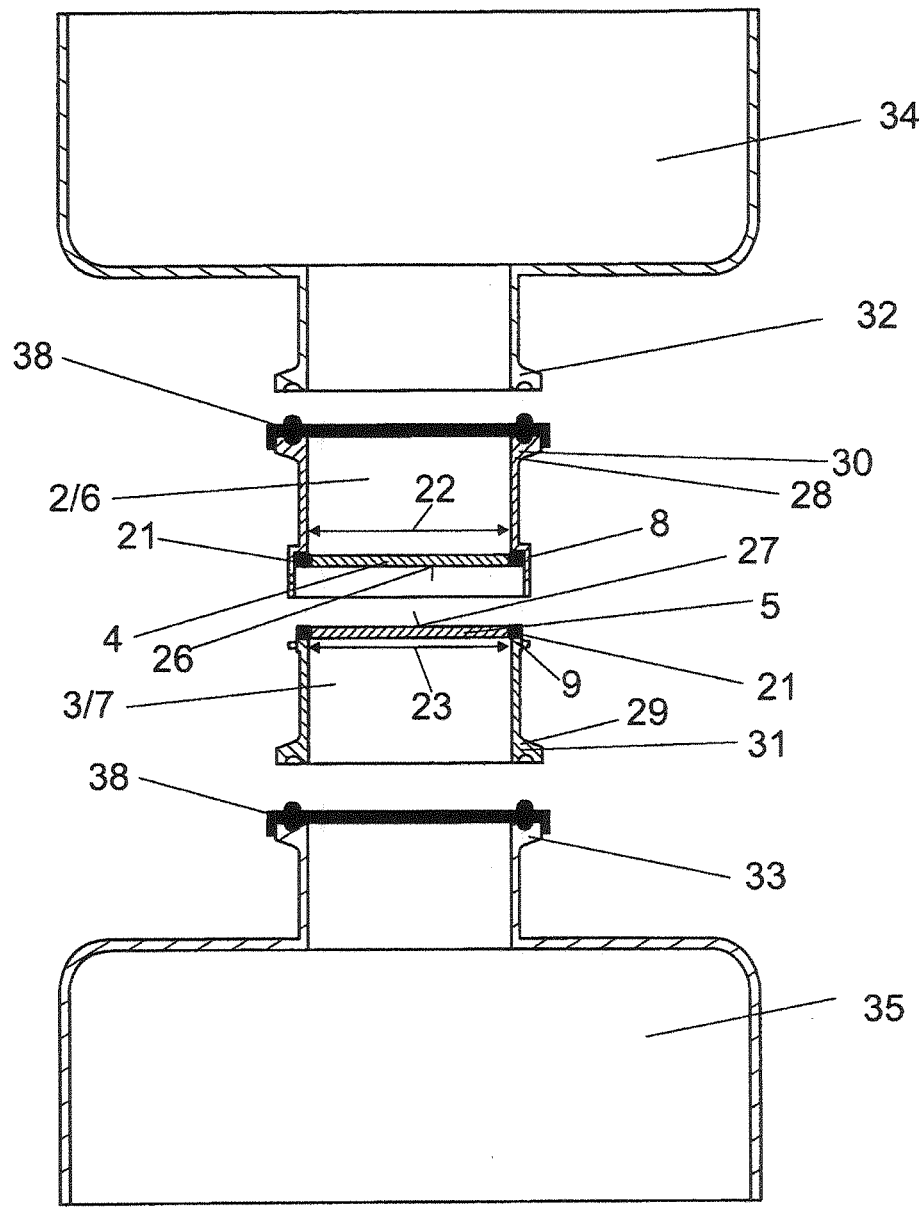
FIG. 5 shows a side view in section as an exploded drawing of a device corresponding to FIG. 3 without a clamping connector and without an actuating part.
Figures 6A, 6B:
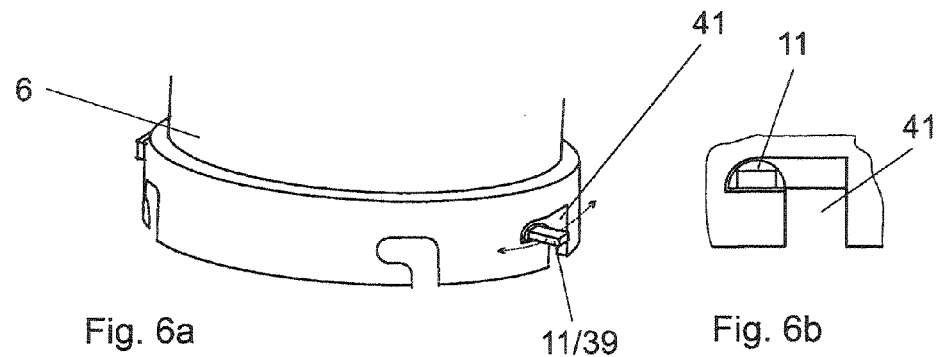
FIG. 6a shows a three-dimensional representation of the first housing section of FIG. 1, represented in outline and enlarged, with the first half-shaft locked.
FIG. 6b shows a side view of the locked half-shaft of FIG. 6a, represented in outline and enlarged.
Figures 7A, 7B:
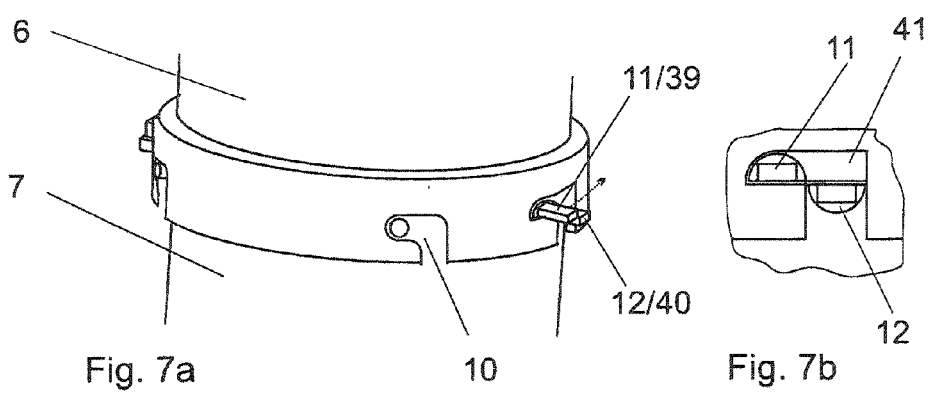
FIG. 7a shows a three-dimensional representation of the housing sections of FIG. 1 locked together, represented in outline and enlarged, with the first half-shaft locked and the second half-shaft blocked by the first half-shaft.
FIG. 7b shows a side view of the locked half-shaft of FIG. 7a, represented in outline and enlarged.
Figures 8A, 8B:
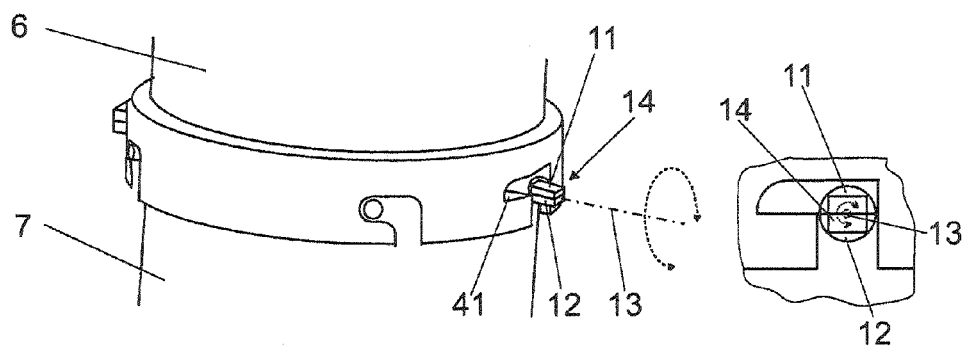
FIG. 8a shows a three-dimensional representation of the housing sections of FIG. 1 locked together, represented in outline and enlarged, with the first half-shaft unlocked and the released second half-shaft which forms a pivotable shaft with the first half-shaft.
FIG. 8b shows a side view of the half-shaft of FIG. 8a represented in outline and enlarged.
Figure 9:
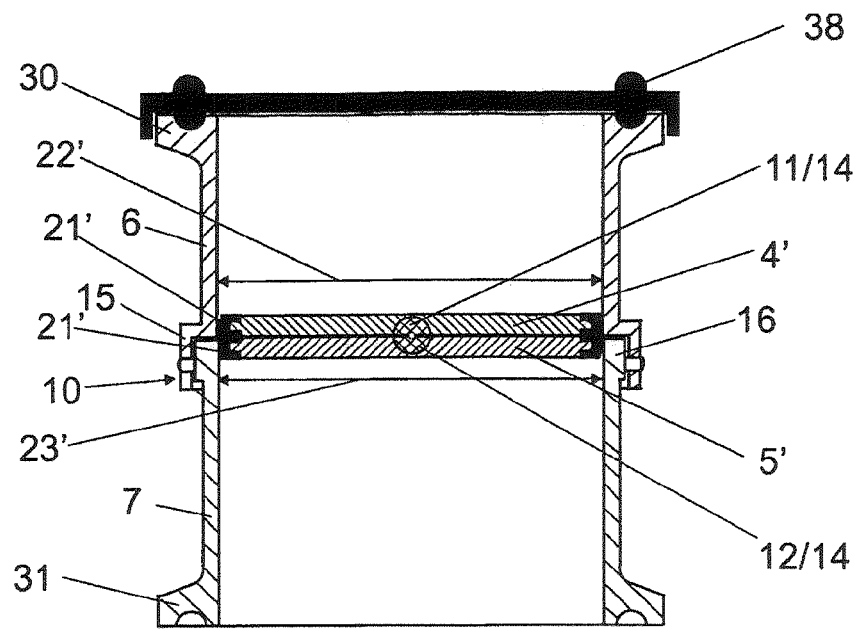
FIG. 9 shows a side view in section of a further device with locked housing sections and two cap-shaped seals on the outside edge of the valve disks.

Corresponding to the exemplary embodiments of FIGS. 2, 3 and 5, the ends 8, 9 of the housing sections 6, 7 in each case comprise a seal 21 which seals the lumen 22, 23 of the housing sections 6, 7 with respect to the outside edges 24, 25 of the valve disks 4, 5.

Corresponding to the exemplary embodiments of FIGS. 9 to 15, the valve disks 4', 4", 5', 5" for sealing with respect to the adjacent lumen 22', 22", 23', 23" in each case comprise a seal 21', 21" which, in each case, surrounds the outside edge 24', 24", 25', 25" of the valve disk 4', 4", 5', 5" in a cap-shaped manner.

With the valve disks 4', 4", 5', 5" in the open state, the seals 21', 21" at the same time seal the outside edges 24', 24", 25', 25" thereof with respect to one another such that no transfer medium is able to penetrate between the two outer faces 26', 26' of the valve disks 4', 4", 5', 5" which are adjacent to one another.

Figure 10:
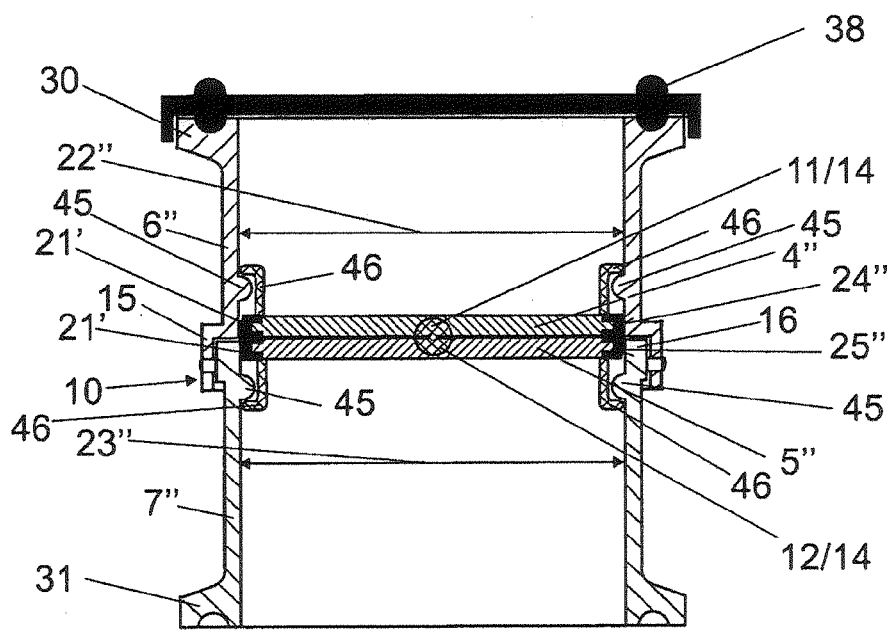
FIG. 10 shows a side view in section of a further device with locked housing sections and valve disks which are latchable with the housing sections by means latching hooks on the valve disks and knobs on the housing sections.
Figure 11:
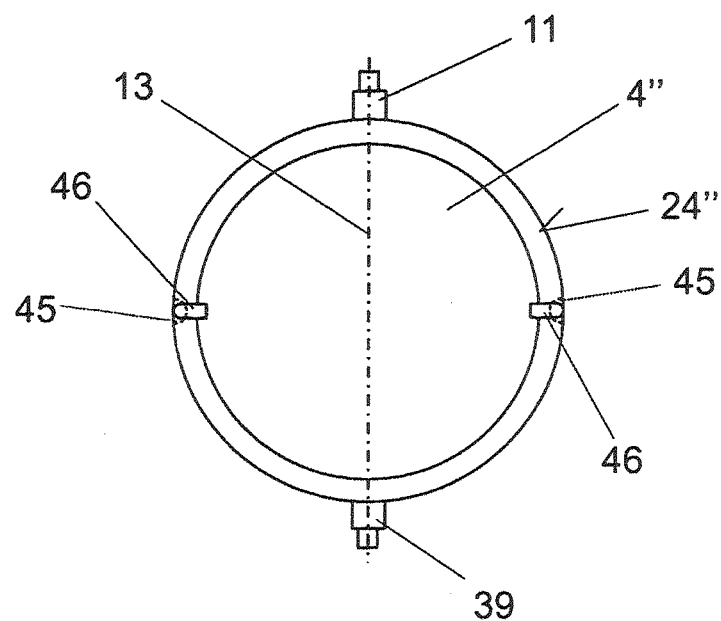
FIG. 11 shows a top view of the first valve disk from FIG. 10 with knobs of the first housing section indicated by the broken line.

As an alternative to the fixing possibilities for the valve disks 4", 5" described for FIG. 1, according to FIGS. 10 and 11 several latching lugs or latching knobs 45, which in each case can be engaged over in pairs by preferably flexible latching hooks 46, can be mounted on the inside walls of the first housing section 6" and of the second housing section 7", as a result of which the respective valve disk 4" or 5" with the valve device 1 closed is lockable in the manner of a snap-type connection in its respective position closing the inflow 2 or the outflow 3. Said snap-type connection can be released, in each case, as a result of a relatively small application of force, such as, for example, when actuating the actuating part 18 which is placed onto the form attachment 17, the engagement of the latching hooks 46 over the latching lugs or latching knobs 45 being revoked and the valve disks 4", 5" pivoting into the open position of the valve device 1.

The latching lugs or latching knobs 45 and the latching hooks 46 can be mounted in pairs equidistantly on the inside walls of the housing sections 6, 7 or on the outside edges 24", 25" of the valve disks 4", 5", there being at least two pairs of latching knobs and latching hooks.

On the second ends 28, 29 of the housing sections 6, 6", 7, 7" remote from their first ends 8, 9, the housing sections 6, 6", 7, 7" in each case comprise a connecting piece 30, 31 for connection to a corresponding connecting piece 32, 33.

The connecting piece 32 which corresponds with the first connecting piece 30 is connected to a first container 34 which contains the transfer medium. The connecting piece 33 which corresponds with the second connecting piece 31 is connected to a second container 35, into which the transfer medium is to be transferred. The connecting pieces 30, 32 and 31, 33 which correspond to one another are connected together in each case by means of a clamping bracket 36. Two connecting parts 30, 32 and 31, 33 which correspond with one another in each case form a so-called tri-clamp joint 37 in conjunction with the clamping bracket 36 associated therewith. A seal 38 is arranged in each case between two connecting pieces 30, 32 and 31, 33 which correspond with one another.

In the exemplary embodiment, the transfer medium contained in the first container 34 is a powder which is transferable in a dust-free manner into the second container 35 which is a target or mixing sack.

To transfer a transfer medium out of the first container 34 into the second container 35, the following steps are carried out:

a) connect the first housing section 6, 6" by means of its first connecting piece 30 to the corresponding connecting piece of the first container 34 by placing in position and screw-connecting a clamping bracket 36;

b) connect the second housing section 7, 7" by means of its second connecting piece 31 and its corresponding connecting piece 33 by placing in position and screw-connecting the clamping bracket 36 to the second container 35;

c) connect together the ends 8, 9 of the housing sections 6, 6", 7, 7" which comprise the valve disks 4, 4', 4", 5, 5', 5" such that the two half-shafts 11, 12 form one common shaft 14 and the valve disks 4, 4', 4", 5, 5', 5" abut closely against one another by way of their outer faces 26, 26', 27, 27' which face one another;

d) place the actuating part 18 onto the form attachment 17 of the shaft 14, e) open the valve device 1 by pivoting the common shaft 13, by way of which the valve disks 4, 4', 4", 5, 5', 5" are pivoted into an open position;

f) close the valve device 1 by pivoting the two valve disks 4, 4', 4", 5, 5', 5" back into their closed position once the provided amount of transfer medium has been transferred into the second container 35; and g) release the connection between the first container 34 and the second container 35 by pulling off the actuating part 18 and releasing the two housing parts 6, 7 from one another which are closed by the valve disks 4, 4', 5, 5'.

LIST OF REFERENCES

1 Valve device
2 Inflow
3 Outflow
4, 4', 4" First valve disk
5, 5', 5" Second valve disk
6, 6' First housing section
7, 7' Second housing section
8 First end of 6
9 First end of 7
10 Locking means
11 First half-shaft
12 Second half-shaft
13 Virtual rotational axis
14 Pivotable shaft 15 Wall of 6
16 Wall of 7
17 Form attachment
18 Actuating part
19 Receiving opening of 18
20 Square of 17
21, 21' Seal of 6, 7
22, 22', 22" Lumen of 6
23, 23', 23" Lumen of 7
24, 24', 24" Outside edge of 4
25, 25', 25" Outside edge of 5
26, 26' First outer face of 4
27, 27' Second outer face of 5
28 Second end of 6
29 Second end of 7
30 First connecting piece of 6
31 Second connecting piece of 7
32 Corresponding connecting piece of 30
33 Corresponding connecting piece of 31
34 First container
35 Second container
36 Clamping bracket
37 Tri-clamp joint
38 Seal
39 End of 11
40 End of 12
41 L-shaped recess of 6
42 Longitudinal axis
43 Short portion of 41
44 Long portion of 41
45 Latching knobs
46 Latching hooks

The invention claimed is:

1. A valve device (1) for transferring a transfer medium, said valve device comprising: an inflow (2), an outflow (3) and first and second valve disks (4, 4', 4", 5, 5', 5") that are arranged one behind another in a direction of flow, first and second half-shafts (11, 12) fixed respectively to the first and second valve disks (4, 4', 4", 5, 5', 5"), the half shafts (11, 12) being alignable with one another so that the valve disks (4, 4', 4", 5, 5', 5") are pivotable about a common rotational axis (13) for opening and closing a lumen (22, 22', 22", 23, 23', 23") that surrounds the valve disks (4, 4', 4", 5, 5', 5"), the inflow (2) and the outflow (3) being formed by first and second housing sections (6, 6", 7, 7") that are lockable together, the first and second housing sections (6, 6", 7, 7") being formed with ends (8, 9) facing one another, the end (8) of the first housing section (6, 6") being formed with two opposite L-shaped recesses (41), each L-shaped recess (41) having a longitudinal leg extending parallel to an axis of the lumen and a transverse leg extending transverse to the axis of the lumen and configured to receive the first half-shaft (11), the end of the second housing being formed with two opposite recesses configured to receive the second half shaft (12), wherein, with the housing sections (6, 6", 7, 7") in a locked state, the first half-shaft (11) aligns with the longitudinal legs of the L-shaped recesses (41) and with the second half shaft (12) to form one common shaft (14) that is pivotable about the rotational axis (13) and the valve disks (4, 4', 5, 5') abut closely against one another, and in that, with the housing sections (6, 6", 7, 7") in a non-locked state, the first half shaft (11) is in the transverse legs of the L-shaped recesses (41) and is offset from the second half shaft (12) so that the valve disks (4, 4', 4", 5, 5', 5") in each case close the lumen (22, 22', 22", 23, 23', 23") of the housing section (6, 6", 7, 7") receiving them.

2. The valve device of claim 1, wherein the two half-shafts (11, 12) that abut against one another project by way of at least one end (39, 40) out of walls (15, 16) of the housing sections (6, 6", 7, 7") receiving them and together form a form attachment (17), onto which an actuating part (18) with a corresponding receiving opening (19) can be placed.

3. The valve device of claim 2, wherein the form attachment (17) formed by the half-shafts (11, 12) has a square cross section.

4. The valve device of claim 1, further comprising a seal (21, 21') arranged between an outside edge (24, 24', 24", 25, 25', 25") of the valve disks (4, 4', 4", 5, 5', 5") and an adjacent wall (15, 16) of the housing sections (6, 6", 7, 7").

5. The valve device of claim 1, wherein an outside edge (24', 24", 25', 25") of each valve disk (4', 4", 5', 5") comprises a cap-shaped circumferential seal (21') that seals, on the one hand, the valve disks (4', 4", 5', 5") with respect to the adjacent lumen (22', 22", 23', 23") and, on the other hand, the valve disks (4', 4", 5', 5") on the edge (24', 24", 25', 25") with respect to one another.

6. The valve device of claim 1, wherein ends of the housing sections (6, 6", 7, 7") remote from the valve disks (4, 4', 4", 5, 5', 5") each comprise a connecting piece (30, 31) for connection to a corresponding connecting piece (32, 33).

7. The valve device of claim 1, wherein the first housing section (6) comprises the inflow (2) and is connectable to a connecting piece (32) of a first container (34) and the second housing section (7) comprises the outflow (3) and is connectable to a connecting piece (33) of a second container (35).

8. The valve device of claim 7, wherein the transfer medium is a bulk material and the first container (34) is a sack out of which the bulk material is transferable into the second container (35), which is a target or mixing sack.

9. A method for transferring a transfer medium, said method using a valve device (1) with an inflow (2) connected to a first container (34) that contains the transfer medium and an outflow (3) connected to a second container (35) that receives the transfer medium, the method comprising:

a) connecting a first housing section (6, 6', 6") to the first container (34), the first housing section (6, 6', 6") comprises the inflow (2) and, on its end remote from the first container (34), comprises an L-shaped recess (41) with a longitudinal leg parallel to the inflow (2) and a transverse leg transverse to the longitudinal leg, a first valve disk (4, 4', 4") with a first half-shaft (11) in the transverse leg and offset from the longitudinal leg and in a position that closes the inflow (2);

b) connecting a second housing section (7, 7") to the second container (35), the second housing section (7, 7") comprises the outflow (3) and on its end remote from the second container (35), comprises a second valve disk (5, 5', 5") with a second half-shaft (12) in a position that aligns with the longitudinal leg of the L-shaped recess in the first housing section (6, 6', 6") and closes the outflow (3);

c) connecting together the ends (8, 9) of the housing sections (6, 7) that comprise the valve disks (4, 4', 4", 5, 5', 5") and rotating the housing sections (6, 7) so that the first half-shaft (11) aligns with the longitudinal leg of the L-shaped recess such that the two half-shafts (11, 12) form one common shaft (14) and the valve disks (4, 4', 4", 5, 5', 5") abut closely against one another by way of their outer faces (26, 26', 27, 27') that face one another;

d) placing an actuating part (18) onto an end of the common shaft (14) of the valve disks (4, 4', 4", 5, 5', 5"), e) opening the valve device (1) by pivoting the common shaft (14) with the two valve disks (4, 4', 4", 5, 5', 5") into an open position;

f) closing the valve device (1) by pivoting the two valve disks (4, 4', 4", 5, 5', 5") back into their closed position once the provided amount of transfer medium is transferred into the second container (35); and g) releasing the connection between the first and the second container (34, 35) by pulling off the actuating part (18) and rotating the housing sections (6, 7) so that the first half shaft (11) is offset from the longitudinal leg of the L-shaped recess (41) and offset from the second half-shaft (12) and releasing from one another the two housing parts (6, 6", 7, 7") that are closed by the valve disks (4, 4', 4", 5, 5', 5").

10. The method of claim 9, wherein the ends (8, 9) of the housing sections (6", 7") that comprise the valve disks (4, 4', 4", 5, 5', 5") are latched together as a result of fitting into one another and rotating.

11. The method of claim 9, wherein a powdery filtering aid for a precoat filtration is transferred as the transfer medium.

* * * * *